Figure 1:
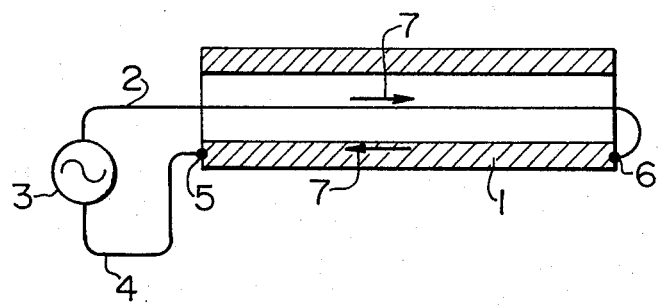

United States Patent [19]
Ando

[11] 3,975,819
[45] Aug. 24, 1976

[54] METHOD FOR PASSING AN INSULATED WIRE THROUGH THE INSIDE OF FERROMAGNETIC PIPE FOR A HEAT-GENERATING PIPE UTILIZING SKIN EFFECT CURRENT

[75] Inventor: Masao Ando, Yokohama, Japan

[73] Assignee: Chisso Corporation, Osaka, Japan

[22] Filed: Jan. 8, 1975

[21] Appl. No.: 539,561

[30] Foreign Application Priority Data
Jan. 9, 1974 Japan.................................. 49-5792

[52] U.S. Cl............................... 29/611; 219/10.49; 219/10.51; 219/301
[51] Int. Cl.².......................................... H05B 3/00
[58] Field of Search..................... 29/611, 433, 241; 254/134.3 R, 134.4, 134.5, 134.6, 134.7; 219/306, 307, 319, 10.49, 10.51, 10.41, 10.57, 301

[56] References Cited
UNITED STATES PATENTS

| | | |
|---|---|---|
| 920,455 | 5/1909 | Greenan ........................... 254/134.4 |
| 1,598,293 | 8/1926 | Luck............................ 254/134.7 X |
| 3,079,673 | 3/1963 | Loehlein et al....................... 29/611 |
| 3,293,407 | 12/1966 | Ando .................................. 219/301 |
| 3,374,535 | 3/1968 | Tranel................................. 29/611 |
| 3,591,770 | 7/1971 | Ando ............................. 219/301 X |
| 3,840,972 | 10/1974 | Bindari ................................ 29/433 |

Primary Examiner—Victor A. DiPalma
Attorney, Agent, or Firm—Fred Philpitt

[57] ABSTRACT

In the construction of heat-generating pipe utilizing skin effect current consisting of a ferromagnetic pipe and an insulated wire passed therethrough, a liquid is introduced in advance in said ferromagnetic pipe, and then the insulated wire having an arrangement for making an apparent specific gravity thereof almost equal to or smaller than the specific gravity of said liquid is passed through the inside of the ferromagnetic pipe, whereby the frictional force between said ferromagnetic pipe and insulated wire is reduced, and passing of insulated wire through longer ferromagnetic pipe becomes easier.

3 Claims, 5 Drawing Figures

METHOD FOR PASSING AN INSULATED WIRE THROUGH THE INSIDE OF FERROMAGNETIC PIPE FOR A HEAT-GENERATING PIPE UTILIZING SKIN EFFECT CURRENT

DESCRIPTION OF THE INVENTION

This invention relates to a method for passing an insulated wire through the inside of a ferromagnetic pipe in the construction of heat-generating pipe utilizing skin effect current.

The heat-generating pipe referred to herein consists of a ferromagnetic pipe and an insulated wire passed therethrough, with such an arrangement that when an alternating current is passed through said insulated wire, an alternating current corresponding thereto flows concentratedly through the inner skin portion of said ferromagnetic pipe, to generate heat, but practically no current appears on the outer skin. The heat-generating pipe of the present invention includes those disclosed in U.S. Pat. Nos. 3,293,407 (issued to Masao Ando, Dec. 20, 1966) and 3,515,837 (issued to Masao Ando, June 2, 1970) wherein its principle is illustrated.

The present invention will now be illustrated referring to the accompanying drawings.

FIG. 1 shows a schematically cross-sectional view of an example of the heat-generating pipe utilizing skin effect current, to which the method of the present invention is applied.

Figure 2:
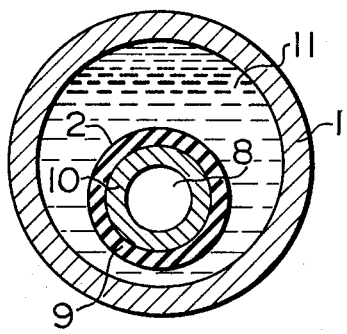
Figure 3:
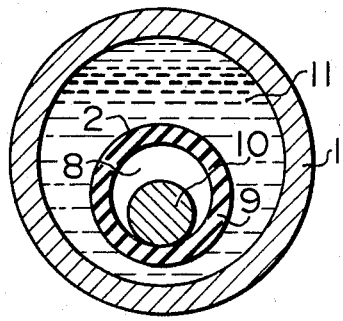
Figure 4:
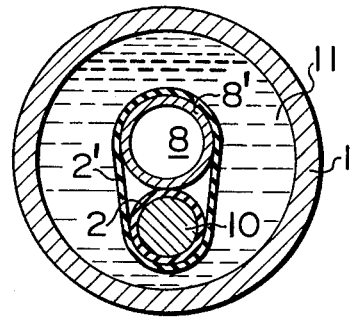

FIGS. 2, 3, and 4 show schematical views of lateral cross-section of the heat-generating pipe wherein various kinds of insulated wire having therein a clearance part are passed through a ferromagnetic pipe according to the method of the present invention.

Figure 5:
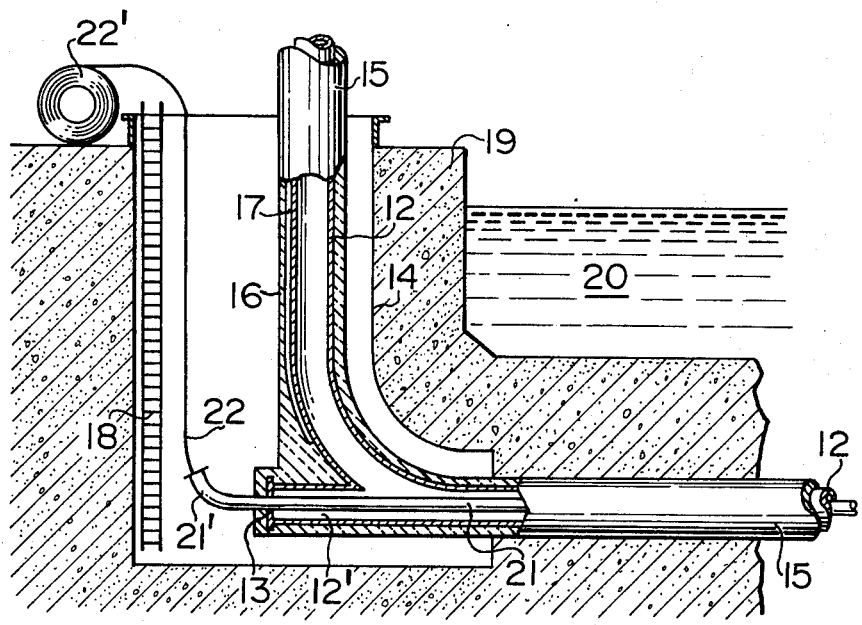

Fig. 5 shows a cross-sectional view of the heat-generating pipe to which the method of the present invention is applied, showing schematically how a concrete operation is carried out according to the present invention.

FIG. 1 shows a heat-generating pipe utilizing skin effect current disclosed in said U.S. Pat. No. 3,293,407. In this figure, numeral 1 shows a pipe of ferromagnetic material such as steel pipe and numeral 2 shows an insulated wire passed therethrough, said pipe and said insulated wire being connected in series at both the ends 5 and 6 of the pipe 1 to electric source 3 by means of conductor 4 to form a circuit of alternating current.

In FIG. 1, if a follwing relationship is existent between the thickness $t$ (cm) of ferromagnetic pipe 1 and $S$ (cm) referred to as the depth of alternating current flowing therethrough:

$$t > 2S \qquad (1)$$

and further if another following relationship is existent between the inner diameter of said pipe $d$ (cm) and the length thereof $l$ (cm):

$$l >> d \qquad (2)$$

then alternating current 7 flows through the inner skin portion of ferromagnetic pipe 1. The condition of the above formula 2 is not always necessary, but other conditions can be substituted therefor.

At any rate, alternating current 7 flows concentratedly through the inner skin portion of the ferromagnetic pipe 1 to generate heat, and even if a metal body is brought into contact with the outer surface of the pipe, there is no danger of electric shock or leakage. Thus the pipe having an insulated wire passed therethrough has such a characteristic property that it can contact directly a body to be heated in order to heat the body. In addition, the skin depth $S$ of the above formula 1 is expressed as follows:

$$S = 5030 \sqrt{\frac{\rho}{\mu f}} \qquad (3)$$

wherein $\rho$ ($\Omega$ cm) means the resistivity of ferromagnetic pipe 1, $\mu$ means its magnetic permeability and $f$ (Hz) means the frequency of alternating current 3.

The heat-generating pipe utilizing skin effect current disclosed in said U.S. Pat. No. 3,515,837 is so constructed in principle that one or two or more ferromagnetic pipes may be electrically connected at the ends of the pipe or pipes in series in the direction of length to form a closed circuit, and on the other hand, a wire may be passed through the inside of the pipe or pipes, both the ends of the wire being connected with two terminals of an alternating current source, respectively, to form a closed circuit, and an insulated layer being provided betweem the ferromagnetic pipe or pipes and the wire, whereby, when an alternating current is passed through the wire, and alternating current may be induced in the inner skin portion of the ferromagnetic pipe or pipes. The heat-generating pipe thus constructed satisfies the abovementioned formula 1.

In addition, in the heat-generating pipes utilizing skin effect current shown in FIGS. 1 and 2, ferromagnetic pipes having optional shapes in their cross-section such as circular or triangular one can be employed. Further, as for the wall of said pipe 1, when the body to be heated also has a wall of ferromagnetic material as in the pipeline of steel, a part of the wall of the body to be heated may constitute a part of the wall of said pipe 1. In this case, said pipe is to be composed of a part of the wall of the body to be heated, and a covering means of ferromagnetic material, and this covering means is usually welded onto the wall of the body to be heated. This welding can be made either continuously or intermittently.

The heat-generating pipe utilizing skin effect current including those disclosed in said U.S. patents has been utilized as a heating source for a body to be heated, when the temperature of the body is maintained at 70°C or lower and its length is very large, for example, that for a pipeline for transporting a fluid which requires temperature-maintenance, such as fuel heavy oil, a certain kind of crude oil, etc. Recently, however, applications of the heat-generating pipe not only to a short distance pipeline but also to long distance sea-bottom pipeline have been also in great demand.

However, if the sea-bottom pipeline has such a large length as large as exceeding 1,000 m, it will become necessary for the heat-generating pipe utilizing skin effect current as the heating source for the pipeline over the whole length thereof to have also a length of 1,000 m or longer. As for the general process for constructing such a pipeline having the heat-generating pipe utilizing skin effect current, ferromagnetic pipe 1 is fixed onto the pipeline in advance and then insulated wire 2 is passed therethrough, and since the length of a drum of wire is in the range of 300 m to 1,000 m in most of the cases, wire 2 is passed through the inside of ferromagnetic pipe 1 in the unit of such length in case of a pipeline on the ground. In such a range of length, if the pipeline is straight and horizontal, the frictional force between the wire and the inner surface of the ferromagnetic pipe does not bring about harmful effect on the insulation of the wire. Accordingly, on the ground, a pipeline having a length of several kilometers to several tens kilometers or longer can be completed by repeating the above-mentioned operation. Whereas, in the case of a pipeline having a length exceeding 1,000 m as in the above-mentioned sea-bottom pipeline, if the same passing manner of insulated wire as that in the case of a pipeline on the ground is employed, there occurs a danger that the wire is injured due to friction. In order to reduce such frictional force, it may be possible to use a material having a small frictional coefficient such as TEFLON as the insulating material of the wire, but the use of such a material has a restriction for the reason hereinafter described.

An object of the present invention is to provide a method for passing an insulated wire through a ferromagnetic pipe without injuring the wire, in the construction of heat-generating pipe utilizing skin effect current when there is liability of injury of wire due to the frictional force between the wire and the inner surface of the ferromagnetic pipe. Other objects of the present invention will be evident to ones skilled in the art by the description which follows hereinafter.

The present invention resides in a method for constructing a heat-generating pipe utilizing skin effect current which comprises introducing a specified liquid into a ferromagnetic pipe in advance, and then passing an insulated wire having an arrangement for making an apparent specific gravity thereof almost equal to or smaller than the specific gravity of said liquid, through the inside of the resulting ferromagnetic pipe.

In general, when an insulated wire 2 is pulled into a rigid pipe 1 which is straight and placed horizontally, the pulling force required due to the friction pipe, the insulated wire and the inside wall of the pipe, $F$ (kg), is expressed by the following formula:

$$F = fwl \qquad (4)$$

wherein $f$ means the frictional coefficient between both the materials, $W$ is the weight of the wire per meter (kg/m) and $l$ is the length of the wire pulled into the pipe. Since $l$ corresponds to the $l$ of the abovementioned formula 2 and is a given value for each pipeline, there is no other way but to make the values of $f$ or $W$ or both smaller, for making the value of $F$ smaller.

In order to make the value of $f$ smaller, an idea of the use of a mateial having a smaller frictional coefficient such as TEFLON as a jacket for the wire may occur to ones skilled in the art, but such a material has a drawback that it is generally expensive and low in tear strength.

On the other hand, it is impossible to make the weight of wire, $W$, smaller since there are restrictions in the size of conductor to be decided by allowable current, the thickness of insulating material to be decided by voltage, etc., and others. However, if a liquid such as water, oil, etc. is filled in the pipe 1, a buoyancy corresponding to the specific gravity of the liquid acts on the insulated wire 2. In the present invention, such a buoyancy is utilized whereby the inner surface of the ferromagnetic pipe is not pressed by the wire. When the buoyancy becomes equal to the gravity acting on the wire, it goes without saying that the wire does not press the inner surface of the ferromagnetic pipe. Further, even if a liquid is filled in a half amount in a ferromagnetic pipe which is placed horizontally, the wire floats on the surface of the liquid and does not press the inner surface of the pipe, provided that the apparent specific gravity of the wire be smaller than the specific gravity of the liquid.

In practice, it scarcely happens that the ferromagnetic pipe is horizontal along its entire length, and hence, if the liquid is not fully charged into the pipe, the liquid is scattered along the length of the pipe, However, this is considered to be effective as compared with the case where no liquid exists in the pipe because there are considerable lengths of the wire made free from the friction with the inner surface of the pipe.

Water, sea water or oil can be usually employed as liquid.

As for the means for making the apparent specific gravity of the wire smaller, the following structures can be illustrated:

provision of a hollow portion inside the conductor of the wire; provision of a clearance portion between the conductor portion and the insulating layer of the wire; arrangement of the wire embracing a hollow tube; and coating of wire with foamed material as an insulating layer which does not allow liquid to intrude the inside of the foamed material from the outside; and or simple attachment of the foamed material along the length of wire, but not as an insulating coating. As for said foamed material, those having separate cells as well as those having continuous cells with a coated film impervious to the liquid can be used.

It is not always necessary to apply such hollow or foam means along the entire length of the wire, but application of such hollow or foam means at a suitable distance is also possible. Thus, laying of a plurality of buoys attached onto the wire can be also illustrated as one of the means.

The means for making the specific gravity of wire smaller and applications of the present invention will be concretely illustrated referring to the accompanying drawings.

In FIG. 2, numeral 1 shows a ferromagnetic pipe and numeral 2 shows an insulated wire consisting of insulating layer 9 on the outside thereof and conductor 10 having hollow portion 8 therein.

Liquid 11 is filled in the clearance between wire 2 and ferromagnetic pipe 1. When it is assumed that conductor 10 be a hollow cylinder and its inner diameter, thickness and specific gravity be $a$ (cm), $b$ (cm) and $g_c$, respectively, while the specific gravity of liquid be $g_l$, and further the presence of insulating coating 9 be neglected, then the value of a for making the apparent specific gravity of the wire zero will be calculated as follows:

When $$B \ll a \qquad (5)$$

$$g_c \pi a b \approx g_l \frac{\pi}{4} a^2 \qquad (6)$$

hence $$a \approx \frac{4g_c b}{g_l} \qquad (7)$$

On the other hand, the required cross-section of conductor, $A$ (cm$^2$), is expressed by $$A = \pi a b \quad (8)$$

Thus, $a$ and $b$ can be decided according to formulae 7 and 8. For example, if $A = 1$ (cm$^2$) and aluminum is used as the conductor while oil is used as the liquid, $g_c/g_l \fallingdotseq 3.0$, and hence according to formulae 7 and 8, $a = 1.95$ cm and $b = 0.163$ cm FIG. 3 shows a case where clearance part 8 is provided between conductor 10 and insulating layer 9. Since the necessary dimensions of such clearance part 8 can be also calculated in the same manner as in the case of FIG. 2, they are omitted. As for the insulating layer 9 in FIG. 3, a hollow tube of polyethylene can be illustrated. Further, it goes without saying that beside the insulating layer 9, conductor 10 itself can have an insulating coating though this is not shown in the figure.

FIG. 4 shows a case where hollow pipe 8' and insulated wire 2 are embraced together by band 2'.

According to the above-mentioned method wherein a hollow portion is provided inside wire 2 and a liquid is introduced between wire 2 and ferromagnetic pipe 1 in order to make the apparent specific gravity of wire 2 smaller, it appears that the outer diameter of wire 2 resultantly becomes larger than that of wire without any hollow portion, the diameter of ferromagnetic pipe 1 also becomes larger and hence the method is not economical.

However, in the case of the pipeline to be heated, provided in the horizontal region of seabottom or water-bottom as shown in FIG. 5, it is convenient in its construction to pass ferromagnetic pipe 1 through the inside of transporting pipe 12, and in this case, the diameter of ferromagnetic pipe 1 (usually 8–15 cm) is far larger than that (1–4 cm) in the case where ferromagnetic pipe is attached onto the outer surface of transporting pipe 12 therealong (i.e. tracing the transporting pipe). Thus, the wire employed in the present invention does not result in the increase of the dimensions of ferromagnetic pipe.

FIG. 5 shows schematically a portion of pipeline to be heated which enters the water-bottom region 20 from the ground region 19. The vertical portion of transporting pipe 12 is provided with the heat-generating pipe utilizing skin effect current 17 attached onto the outer surface of the transporting pipe therealong, while the horizontal portion of the transporting pipe is provided with the heat-generating pipe utilizing skin effect current which is to be constructed according to the present invention. For constructing the heat-generating pipe utilizing skin effect current to be passed through said horizontal portion, ferromagnetic pipe 21 is installed. For passing insulated wire 22 of the present invention through horizontal ferromagnetic pipe 21, transporting pipe 12 is provided with horizontal projecting portion 12' and sealing portion 13 of transporting pipe as shown in the figure, and for preventing leakage of liquid from ferromagnetic pipe 21, it is necessary to bend the end portions of ferromagnetic pipe 21 slightly upwards as shown by numeral 21', outside heat-insulating layer 16.

Numeral 22' shows a drum on which insulated wire 22 is wound, numeral 14 shows a manhole and numeral 18 shows a ladder for operation. Further, it may be necessary for heat-insulating layer 16 to be provided with jacket for water-proof 15, etc.

Since the object of the sealing of liquid in ferromagnetic pipe 1 is to exert a buoyancy to insulated wire 2 at the time of passing the wire through the ferromagnetic pipe by pulling, the liquid may be removed from the inside of the pipe when said passing operation is finished.

I claim:

1. In the construction of a heat-generating pipe utilizing skin effect current consisting of a ferromagnetic pipe and an elongated insulted wire unit passed therethrough with an arrangement such that when an alternating current is passed through said insulated wire unit an alternating current corresponding thereto flows concentratedly through the inner skin portion of said ferromagnetic pipe to generate heat, but practically no current appears on the outer skin thereof, the method for passing said insulated wire unit through said pipe, which comprises,
    a. introducing a liquid into said ferromagnetic pipe, and
    b. then passing through the inside of said ferromagnetic pipe an insulated wire unit which includes foamed material in a quantity sufficient so as to make the apparent specific gravity of the insulated wire unit almost equal to or less than the specific gravity of said liquid,
    c. said liquid introduced into said pipe being of sufficient quantity to float said insulated wire unit apart from the inner surface of said pipe.

2. In the construction of a heat-generating pipe utilizing skin effect current consisting of a ferromagnetic pipe and an elongated insulated wire unit passed therethrough with an arrangement such that when an alternating current is passed through said insulated wire unit an alternating current corresponding thereto flows concentratedly through the inner skin portion of said ferromagnetic pipe to generate heat, but practically no current appears on the outer skin thereof, the method for passing said insulated wire unit through said pipe, which comprises,
    a. introducing a liquid into said ferromagnetic pipe, and
    b. then passing through the inside of said ferromagnetic pipe an insulated wire unit which has a hollow portion located between the conductor and the insulating layer of said insulated wire unit so as to make the apparent specific gravity thereof almost equal to or less than the specific gravity of said liquid,
    c. said liquid introduced into said pipe being of sufficient quantity to float said insulated wire unit apart from the inner surface of said pipe.

3. In the construction of a heat-generating pipe utilizing skin effect current consisting of a ferromagnetic pipe and an elongated insulated wire unit passed therethrough with an arrangement such that when an alternating current is passed through said insulated wire unit an alternating current corresponding thereto flows concentratedly through the inner skin portion of said ferromagnetic pipe to generate heat, but practically no current appears on the outer skin thereof, the method for passing said insulated wire unit through said pipe which comprises
    a. introducing a liquid into said ferromagnetic pipe, and b. then passing through the inside of said ferromagnetic pipe an insulated wire unit which has a hollow portion inside the conductor thereof so as to make the apparent specific gravity thereof almost equal to or less than the specific gravity of said liquid, said hollow portion consisting of a hollow tube attached exteriorly of the insulated wire, c. said liquid introduced into said pipe being of sufficient quantity to float said insulated wire unit apart from the inner surface of said pipe.

* * * * *